(12) United States Patent
Suma

(10) Patent No.: US 8,267,593 B2
(45) Date of Patent: Sep. 18, 2012

(54) BEARING APPARATUS FOR A WHEEL OF VEHICLE

(75) Inventor: Hiroto Suma, Iwata (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 13/309,937

(22) Filed: Dec. 2, 2011

(65) Prior Publication Data
US 2012/0076450 A1 Mar. 29, 2012

Related U.S. Application Data

(63) Continuation of application No. PCT/JP2010/059378, filed on Jun. 2, 2010.

(30) Foreign Application Priority Data

Jun. 3, 2009 (JP) .................................. 2009-133715

(51) Int. Cl.
*F16C 19/38* (2006.01)

(52) U.S. Cl. ........................................ 384/589; 384/903

(58) Field of Classification Search .................. 384/544, 384/589, 461, 903; 301/105.1
See application file for complete search history.

(56) References Cited

U.S. PATENT DOCUMENTS

| | | | | |
|---|---|---|---|---|
| 5,366,300 | A * | 11/1994 | Deane et al. ................... | 384/589 |
| 6,299,360 | B1 * | 10/2001 | Dougherty et al. ........... | 384/584 |
| 6,851,865 | B2 * | 2/2005 | Nomura et al. ................ | 384/544 |
| 8,047,724 | B2 * | 11/2011 | Kamikawa et al. ............ | 384/589 |
| 2003/0048966 | A1 * | 3/2003 | Nomura et al. ................ | 384/544 |
| 2003/0209939 | A1 * | 11/2003 | Hahn ........................... | 301/105.1 |
| 2007/0217728 | A1 * | 9/2007 | Kashiwagi et al. ............ | 384/544 |
| 2008/0258539 | A1 * | 10/2008 | Schumacher ............... | 301/105.1 |

FOREIGN PATENT DOCUMENTS

| | | |
|---|---|---|
| JP | 1-27923 | 8/1989 |
| JP | 2007-271044 | 10/2007 |
| JP | 2007-292184 | 11/2007 |

* cited by examiner

*Primary Examiner* — Thomas R Hannon
(74) *Attorney, Agent, or Firm* — Harness, Dickey & Pierce, P.L.C.

(57) ABSTRACT

A vehicle wheel bearing apparatus has an outer member, an inner member with a wheel hub, and at least one inner ring, double row rolling elements, seals and a rolling bearing fit onto the inner circumference of the wheel hub positioned and secured by a retaining ring. The retaining ring is mounted at an inner side position of a bearing center line. A retaining ring groove, for mounting the retaining ring, is formed with a substantially rectangular cross-section. Outer side and inner side corner portions of the retaining groove are formed with circular arc cross-sections. Each corner portion has a radius of curvature. The radius of curvature of the outer side corner portion is larger than the radius of curvature of the inner side corner portion.

8 Claims, 9 Drawing Sheets

[Fig 1]
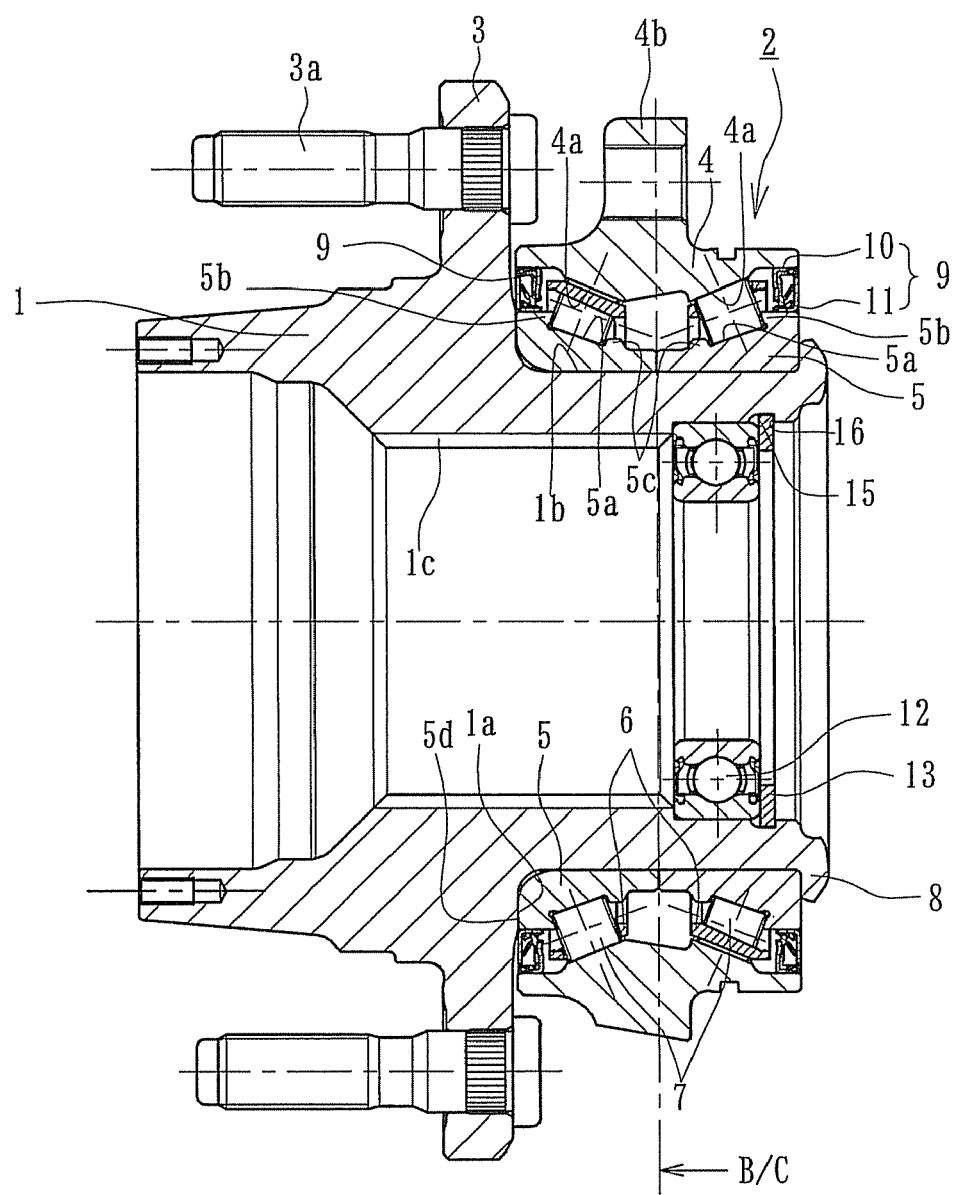

[Fig 2]
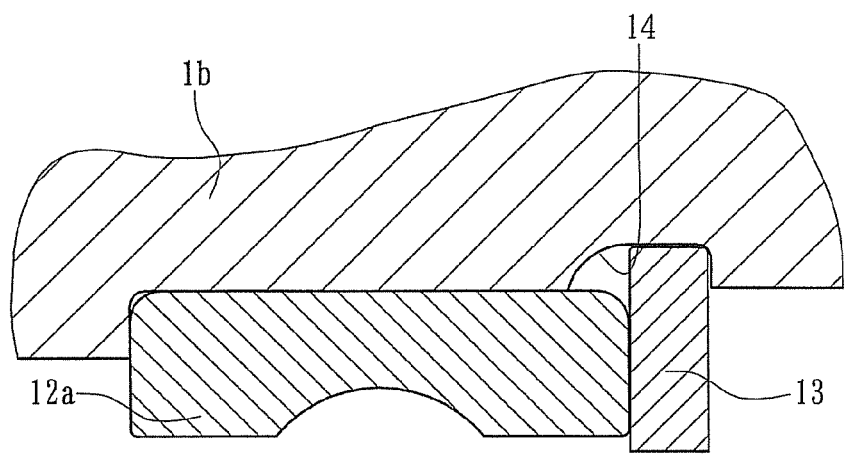
[Fig 3]
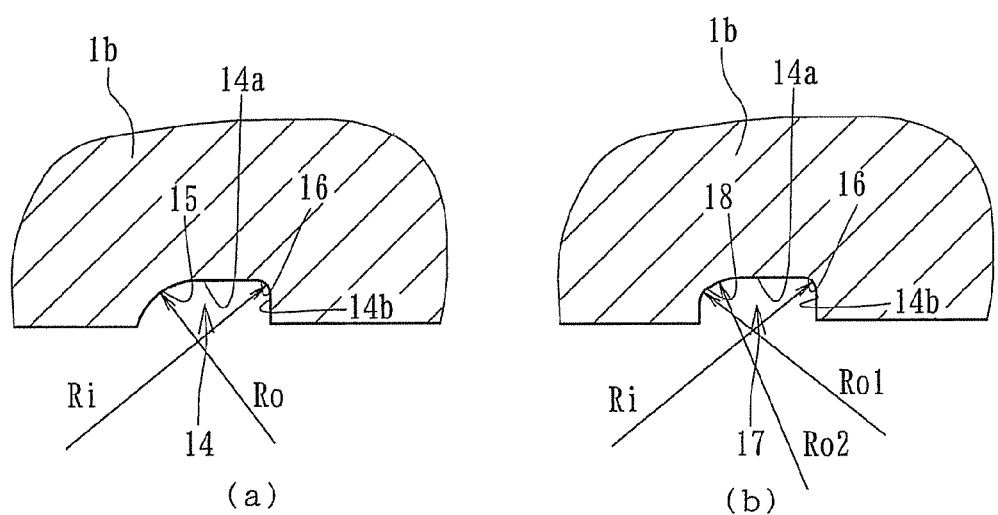

[Fig 4]
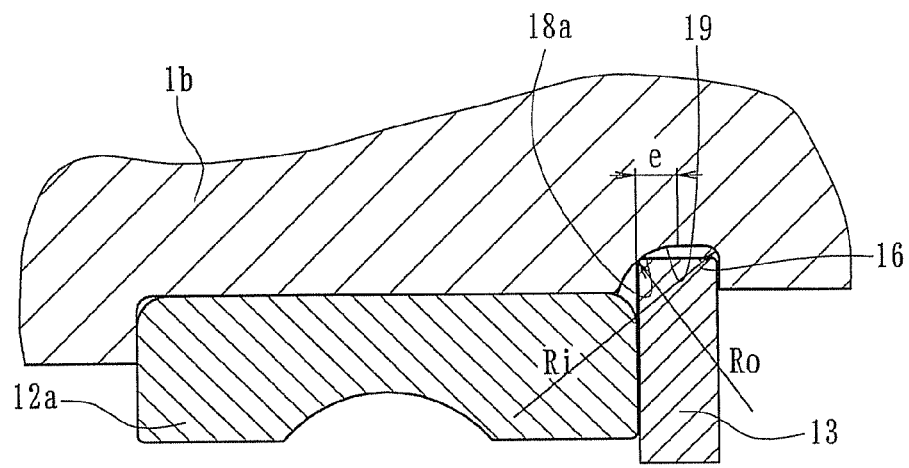
[Fig 5]
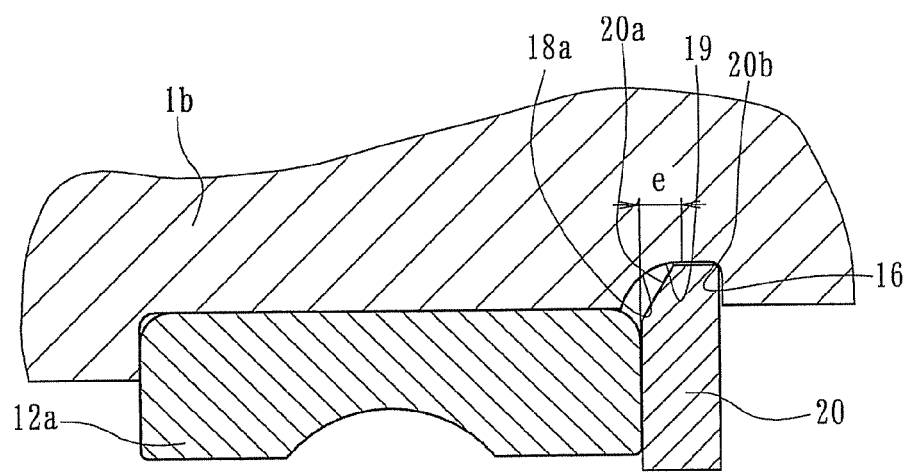

[Fig 6]
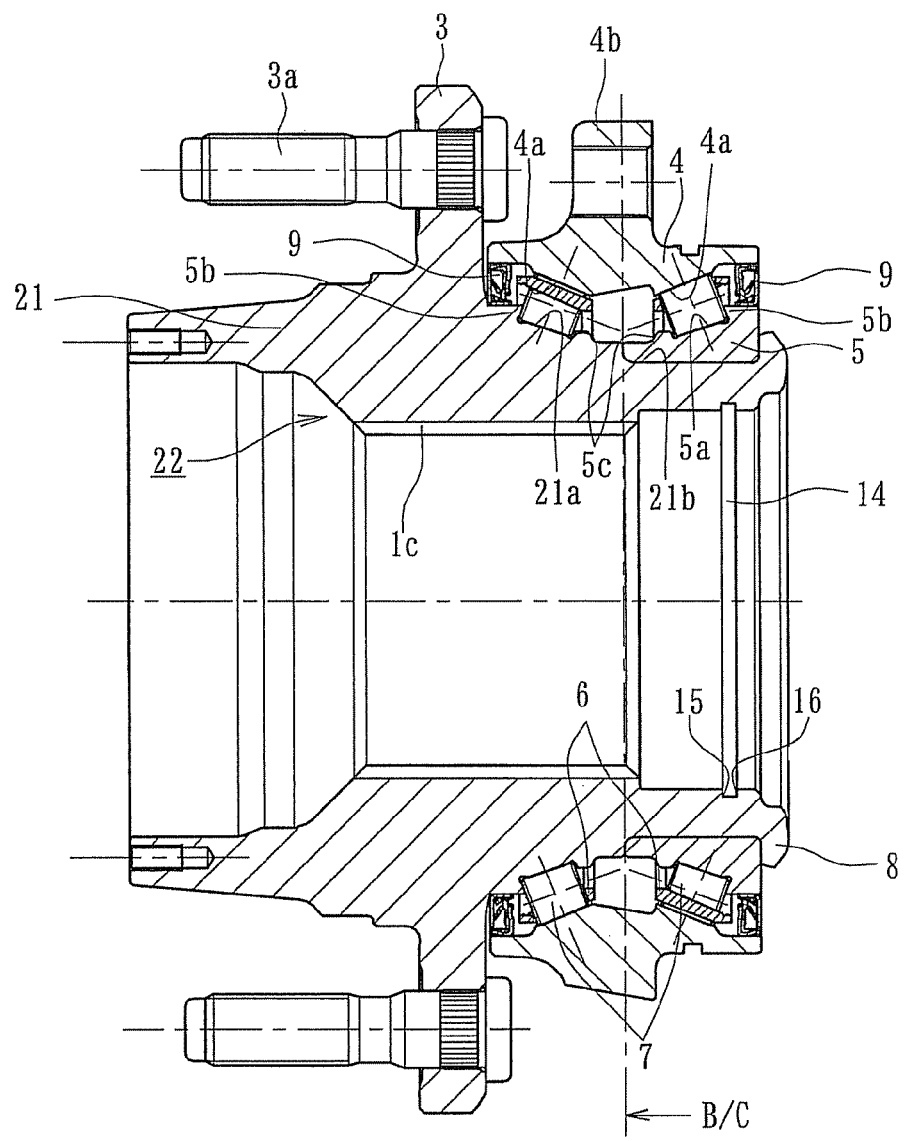

[Fig 7]
PRIOR ART
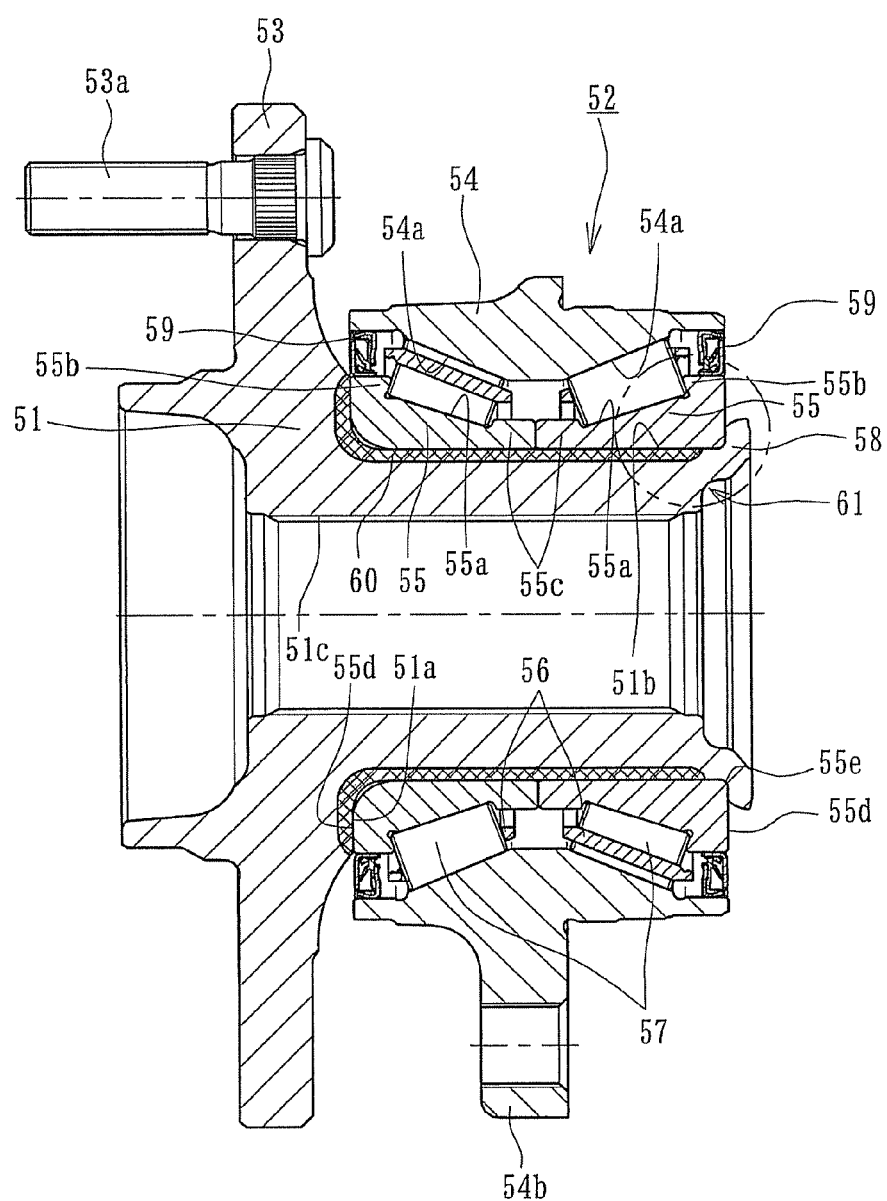

[Fig 8]
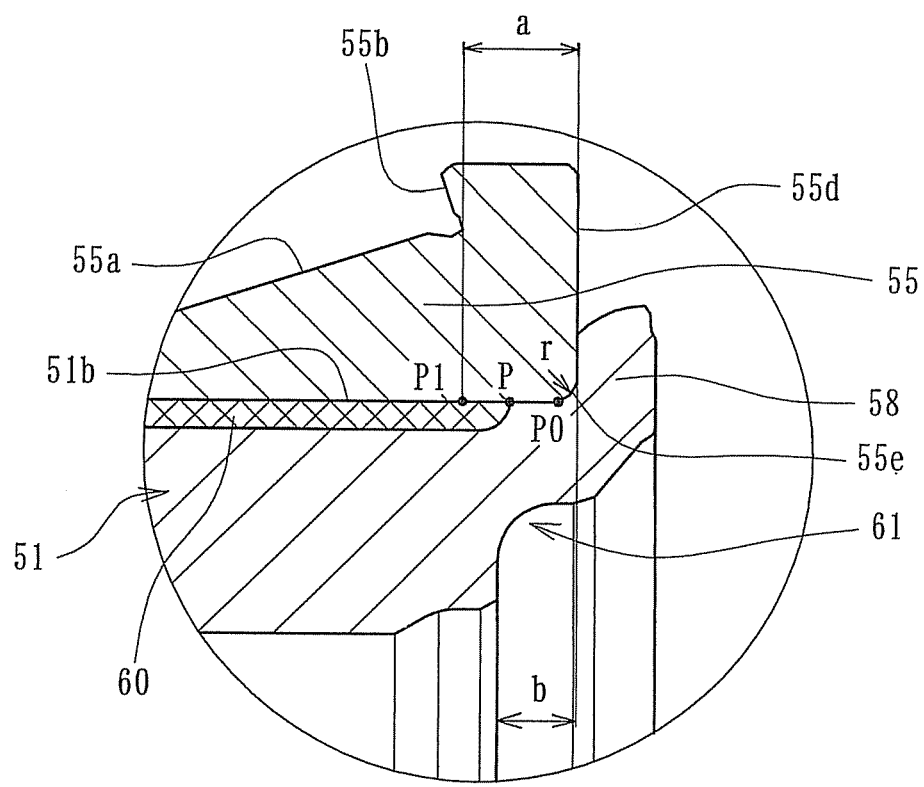

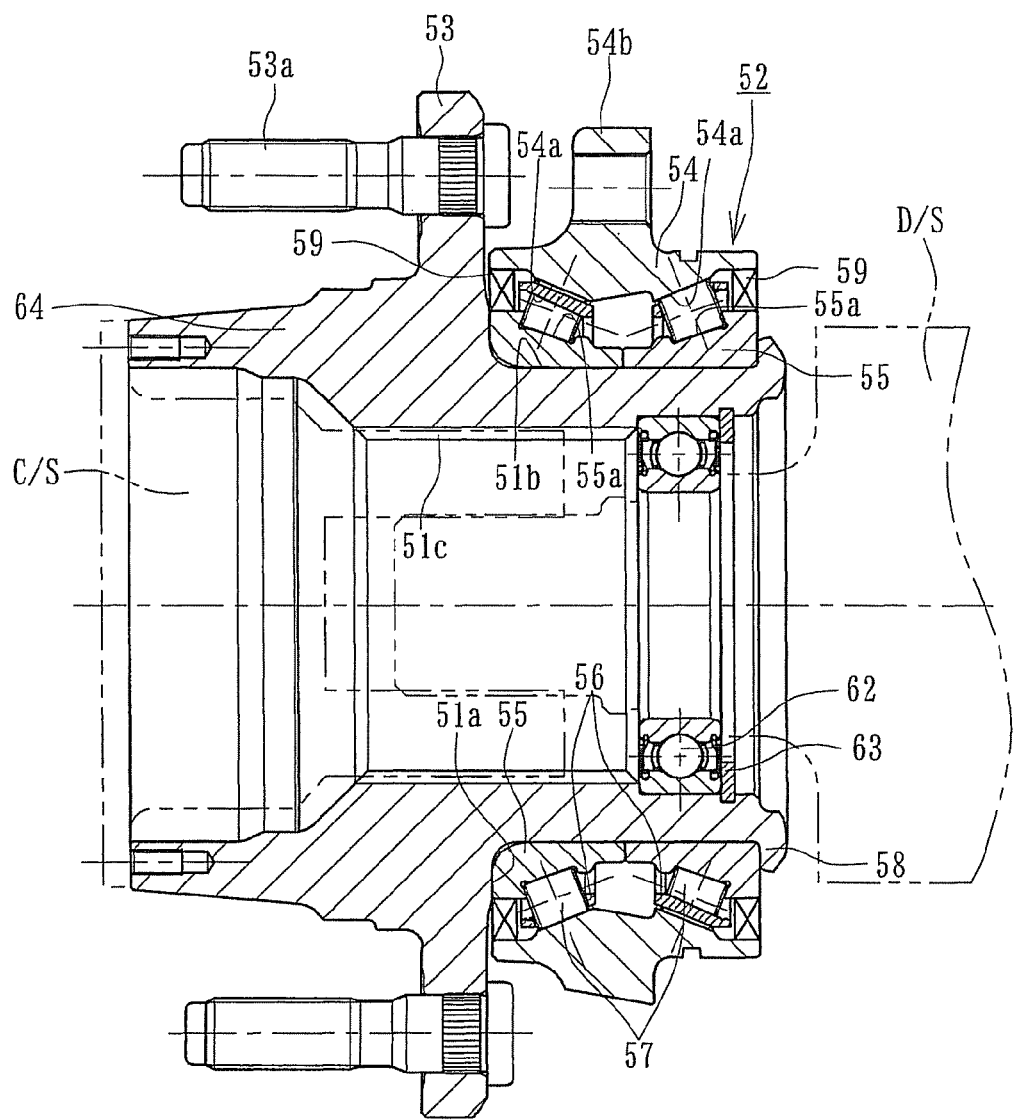
[Fig 9]
PRIOR ART

[Fig 10]
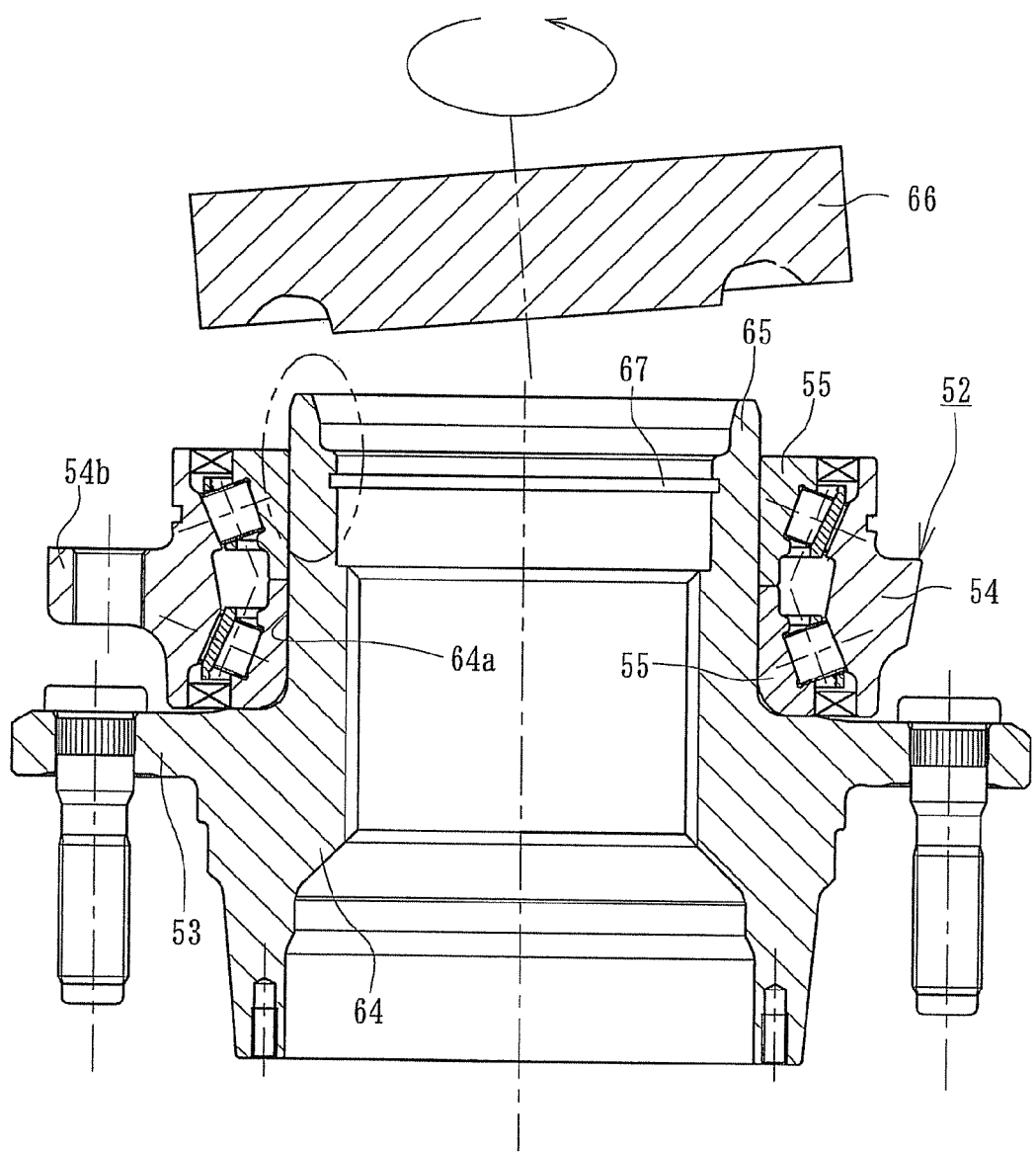

[ Fig 11 ]
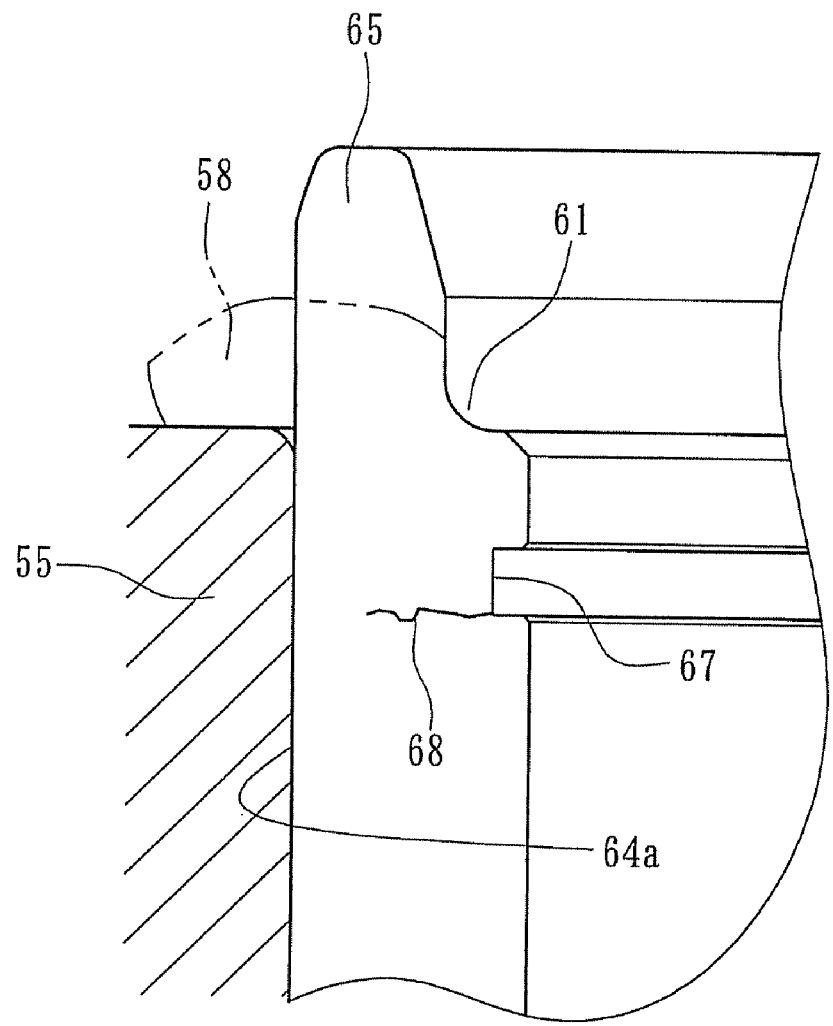

BEARING APPARATUS FOR A WHEEL OF VEHICLE

CROSS-REFERENCE TO RELATED APPLICATIONS

This application is a continuation of International Application No. PCT/JP2010/059378, filed Jun. 2, 2010, which claims priority to Japanese Application No. 2009-133715, filed Jun. 3, 2009. The disclosures of the above applications are incorporated herein by reference.

FIELD

The present disclosure relates to a wheel bearing apparatus that freely rotationally supports a wheel of a vehicle, such as an automobile, and, more particularly, to improvements in the strength and durability of a caulked portion of a wheel hub of the wheel bearing apparatus of the self-retaining type where an inner ring(s) is secured on the wheel hub by caulking and a retaining ring groove, for retaining a bearing, is formed on the inner circumference of the wheel hub

BACKGROUND

Conventionally, a wheel bearing apparatus that supports a wheel of a vehicle that freely rotationally supports a wheel hub mounts a wheel via a rolling bearing. The wheel bearing apparatus includes those for a driving wheel and those for a driven wheel. Considering the structure of the apparatus, in general, the inner ring rotation type is used for the driving wheel and both the inner ring rotation type and the outer ring rotation type are used for the driven wheel type. There are four wheel bearing apparatus generation types. The first generation type includes a wheel bearing with a double row angular contact ball bearing, etc., fit between a knuckle, forming a part of a suspension apparatus, and a wheel hub. The second generation type includes a body mounting flange or a wheel mounting flange directly formed on the outer circumference of an outer member. The third generation type includes one inner raceway surface directly formed on the outer circumference of the wheel hub. The fourth generation type includes inner raceway surfaces formed on the outer circumferences, respectively, of the wheel hub and an outer joint member.

Usually, a wheel is rotatably supported by a double row rolling bearing relative to a suspension apparatus. However, a wheel bearing apparatus provided with a double row tapered roller bearing is used for heavy duty vehicles such as off-road cars, trucks etc.

In the inner ring rotation type of wheel bearing apparatus, it has been adopted, as a type to axially secure the inner ring onto the wheel hub. It is a so-called self-retaining structure where the inner ring is secured on the wheel hub by caulking the end of the wheel hub. FIG. 7 shows a representative example of this structure. It is called a second generation type. It includes a wheel hub 51 and a wheel bearing 52 that is fit onto the wheel hub 51.

The wheel hub 51 has an integrally formed wheel mounting flange 53 on its outer circumference on one end. A cylindrical portion 51b axially extends, through a shoulder portion 51a, from the wheel mounting flange 53. The wheel hub Si also has a torque transmitting serration 51c on its inner circumference. Hub bolts 53a are arranged equidistantly along the periphery of the wheel mounting flange 53.

This wheel bearing 52 includes an outer member 54 integrally formed with a body mounting flange 54b on its outer circumference. The body mounting flange 54b is mounted on a knuckle (not shown). The outer member 54 inner circumference includes double row outer raceway surfaces 54a, 54a. A pair of inner rings 55, 55, each formed on its outer circumference with tapered inner raceway surfaces 55a, is arranged opposite to one of the double row outer raceway surfaces 54a, 54a. Double row tapered rollers 57, 57 are freely rollably contained between the outer and inner raceway surfaces, via cages 56. A larger flange portion 55b, for guiding the tapered roller 57, is formed on the larger diameter side of the inner raceway surface 55a of each inner ring 55. A smaller flange portion 55c, to prevent fallout of the tapered roller 57, is on the smaller diameter side of each inner ring 55. The pair of the inner rings 55, 55 are arranged with their smaller flange portions 55c abutting against each other to form a tapered roller bearing of the back-to-back duplex type.

The wheel bearing 52 is press fit onto the cylindrical portion 51b, via a predetermined interference. The larger end face 55d of the outer side inner ring 55 abuts against a shoulder portion 51a of the wheel hub 51. The wheel bearing is also axially secured relative to the wheel hub 51 by a caulked portion 58. The caulked portion 58 is formed by plastically deforming the end of the cylindrical portion 51b radially outward. Seals 59, 59 are mounted in annular openings formed between the outer member 54 and the pair of inner rings 55, 55. The seals 59, 59 prevent leakage of lubricating grease sealed within the bearing and the entry of rain water or dust into the bearing from the outside.

The wheel hub 51 is hardened by high frequency induction hardening in a region from the shoulder portion 51a, forming a base of the wheel mounting flange 53, to the cylindrical portion 51b. It has a hardened layer 60 with a surface hardness of 50-64 HRC. The caulked portion 58 remains "as is" so that it still has a surface hardness after forging.

The region of the hardened layer 60 is set as shown in FIG. 8. A position P of its inner side end is positioned within a range from an edge P0 of a chamfered portion 55e of the inner ring 55 to a position P1, which corresponds to the width "a" of the larger flange portion 55b (i.e. a root portion of the larger flange portion 55b). This makes it possible not only to improve the durability of the wheel hub 51, due to reduction of fretting wear at the fit surfaces of the inner rings 55, 55, but to reduce an amount of expansion of the end of the cylindrical portion 51b of the wheel hub 51. Thus, this suppresses the deformation of the inner raceway surface 55a and the larger flange portion 55b of the inner ring 55 caused accompanied with the caulking. Accordingly, it is possible to obtain a smooth guidance of the tapered rollers 57 by reducing the contacting surface pressure between the rollers 57 and the inner rings 55 and thus to improve the durability of the inner rings 55.

In addition, a radius of curvature "r" of the chamfered portion 55e of the inner ring 55 is set within a range of R1.0-R2.5 mm. This makes it possible to prevent stress concentrations from being caused at the root portion of the caulked portion 58. Additionally, it prevents an excessive hoop stress from being caused on the outer circumference of the inner ring 55 due to an increased amount of expansion of the cylindrical portion 51b by caulking. Thus, it is also possible to improve the strength and durability of the inner ring 55.

In addition, an annular recessed portion 61 is formed on the end of the cylindrical portion 51b of the wheel hub 51. This recessed portion 61 is formed so that it is smaller than a depth "b" (5 mm) from the larger end face (inner side end face) of the inner ring 55. This makes it possible to assure a predetermined inner ring securing force while maintaining the strength and rigidity of the wheel hub 51. Also, it makes the plastic deformation easy. Thus, it is possible to suppress the hoop stress caused in the inner ring 55. According to the wheel bearing apparatus of the prior art, the durability of the wheel hub 51 can be improved due to a reduction of fretting wear at the fit surfaces of the inner rings 55. In addition, it is possible to reduce an amount of expansion of the end of the cylindrical portion 51b of the wheel hub 51. Thus, this suppresses the deformation of the inner raceway surface 55a and the larger flange portion 55b of the inner ring 55 caused by the accompanying caulking (e.g. see Japanese Laid-open Patent Publication No. 202184/2007).

On the other hand, in a wheel bearing apparatus used for the part-time 4-WD (4 wheel drive) that can perform switching between the 2-WD (2 wheel drive) and the 4-WD, there is a wheel bearing apparatus that includes a rolling bearing, such as a deep groove ball bearing, within the inner circumference of a wheel hub for freely rotatably supporting a driving shaft within the bearing (e.g. see Japanese Laid-open Patent Publication No. 271044/2007

The problem does not arise in the conventional wheel bearing apparatus where the retaining ring groove is located toward the wheel mounting flange side rather than the center of the rolling element. However, the problem arises in the wheel bearing apparatus shown in, for example, FIG. 9, where a rolling bearing 62 is fit onto the inner circumference of a wheel hub 64. That is, in such a wheel bearing apparatus, a retaining ring 63 for positioning and securing the rolling bearing 62, is mounted on the wheel hub 64 at a position near the caulked portion 58. A drive shaft D/S is inserted into the center of the wheel hub. The driving shaft D/S is rotatably supported by the rolling bearing 62 relative to the wheel hub 64 and can be connected to the wheel hub 64, via a clutch mechanism C/S.

As shown in FIG. 10, the end of the cylindrical portion 64a of the wheel hub 64 is initially formed as a straight cylindrical body 65. It is caulked using a swingable caulking tool 66. In such a case, it is believed that micro cracks 68 would be caused to start from a retaining ring groove 67 formed on the inner circumferential surface of the cylindrical portion 64. The cracks 68 occur in positions that are difficult to find in a visual inspection and may sometimes grow to be large ones when the cracks are subjected to large moment loads during running of a vehicle. This results in the induction of a capital deficiency due to the fallout of the caulking portion 58. Thus, it is necessary to have careful attention during machining of the retaining ring groove 67 and the inspection after machining. Accordingly, there are problems that much time is required for machining of the wheel hub 64 and forming of the caulked portion. Thus, the working efficiency is reduced as well as the manufacturing cost is increased.

SUMMARY

It is, therefore, an object of the present disclosure to provide a bearing apparatus for a wheel of a vehicle of the type where a rolling bearing is fit onto the inner circumference of a wheel hub. The roller bearing is positioned and secured by a retaining ring that prevents the generation of micro cracks even though a large moment load is applied to the bearing. Thus, this improves the durability of the seal of the wheel bearing apparatus.

To achieve the object of the present disclosure, a bearing apparatus for a wheel of a vehicle includes an outer member and an inner member. The outer member inner circumference includes double row outer raceway surfaces. The inner member includes a wheel hub formed at one end with a wheel mounting flange on its outer circumference. A cylindrical portion axially extends from the wheel mounting flange. At least one inner ring is press-fit onto the cylindrical portion of the wheel hub, via a predetermined interference. The inner member outer circumference includes double row inner raceway surfaces arranged opposite to the double row outer raceway surfaces. Double row rolling elements are freely rollably contained between the outer and inner raceway surfaces of the outer and inner members, via cages. Seals are mounted within annular openings formed between the outer and the inner members. A rolling bearing is fit into the inner circumference of the wheel hub and positioned and secured by a retaining ring. The retaining ring is mounted at an inner side position of a bearing center line. A retaining ring groove for mounting the retaining ring is formed with a substantially rectangular cross-section. The outer side and inner side corner portions are formed with circular arc cross-sections. Each corner portion has a radius of curvature, respectively. The radius of curvature of the outer side corner portion is larger than the radius of curvature of the inner side corner portion.

The rolling bearing is fit onto the inner circumference of the wheel hub and positioned and secured by a retaining ring. The retaining ring is mounted at an inner side position of a bearing center line. The retaining ring groove for mounting the retaining ring is formed with a substantially rectangular cross-section. The outer side and inner side corner portions are formed with circular arc cross-sections. Each corner portion has a radius of curvature, respectively. The radius of curvature of the outer side corner portion is larger than the radius of curvature of the inner side corner portion. Thus, it is possible to relax the stress caused by a large moment load during running of a vehicle. Accordingly, this prevents the generation of micro cracks as well as improves the durability of the wheel bearing apparatus.

The inner ring is secured relative to the wheel hub by a caulked portion. The caulked portion is formed by plastically deforming the end of the cylindrical portion of the wheel hub. The retaining ring groove is formed near the caulked portion. The tensioning stress is caused mainly in the outer side corner of the retaining ring groove by the plastic deformation of the end of the cylindrical portion of the wheel hub during its caulking process. Thus, it is possible to prevent the generation of cracks and to keep the strength of the caulked portion.

The radius of curvature of the inner side corner portion is limited to R 0.6 mm or less. The radius of curvature of the outer side corner portion is set within a range of R1-R3 mm. This makes it possible to sufficiently relax the tensioning stress in the cylindrical portion of the wheel hub.

The outer side corner portion is formed by a complex R radius that includes a plurality of radii of curvatures. This makes it possible to assure the width of fitting surface of the outer ring of the rolling bearing.

The starting point of the circular arc surface of the outer side corner portion is set at a position away from the inner side from the inner side end face of the outer ring of the rolling bearing by a predetermined distance. This makes it possible to assure the width of the fitting surface of the outer ring of the rolling bearing as well as a further increase in the radius of curvature of the outer side corner portion of the retaining ring groove. Accordingly, this further relaxes the stress concentration of the corner portion of the retaining ring groove.

The starting point of the circular arc surface of the outer side corner portion is set at a position away from the inner side from the inner side end face of the outer ring of the rolling bearing by a distance of substantially half of the width of the retaining ring. This makes it possible to sufficiently assure the width of the fitting surface of the outer ring of the rolling bearing.

The retaining ring is formed with a substantially rectangular cross-section. The radially outer side corner portions of the retaining ring are formed with chamfered portions of different dimensions. An outer side chamfered portion is larger than an inner side chamfered portion. This makes it possible to stabilize fixation of the retaining ring.

The inner side chamfered portion is limited to 0.6 mm and the outer side chamfered portion is set within a range of 1 mm-5 mm. This makes it possible to increase the radius of curvature of the outer side corner portion of the retaining ring groove.

The wheel bearing apparatus of the present disclosure comprises an outer member and an inner member. The outer member, on its inner circumference, includes double row outer raceway surfaces. The inner member includes a wheel hub formed on its outer circumference with a wheel mounting flange at one end. A cylindrical portion axially extends from the wheel mounting flange. At least one inner ring is press-fit onto the cylindrical portion of the wheel hub, via a predetermined interference. The inner member outer circumference includes double row inner raceway surfaces arranged opposite to the double row outer raceway surfaces. Double row rolling elements are freely rollably contained between the outer and inner raceway surfaces of the outer and inner members, via cages. Seals are mounted within annular openings formed between the outer and the inner members. A rolling bearing is fit onto the inner circumference of the wheel hub and positioned and secured by a retaining ring. The retaining ring is mounted at an inner side position of a bearing center line. A retaining ring groove for mounting the retaining ring is formed with a substantially rectangular cross-section. The outer side and inner side corner portions are formed with circular arc cross-sections. Each corner portion has a radius of curvature, respectively, and the radius of curvature of the outer side corner portion is larger than the radius of curvature of the inner side corner portion. Thus, it is possible to relax the stress caused by a large moment load during running of a vehicle. Accordingly, this prevents the generation of micro cracks as well as improves the durability of the wheel bearing apparatus.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 is a longitudinal section view of a first embodiment of a vehicle wheel bearing apparatus.

FIG. 2 is a partially enlarged view of the retaining ring of FIG. 1.

FIG. 3(a) is a partially enlarged cross-sectional view of the retaining ring groove of FIG. 2.

FIG. 3(b) is a partially enlarged cross-sectional view of a modification of the retaining ring groove of FIG. 3(a).

FIG. 4 is a partially enlarged cross-sectional view of a modification of the retaining ring of FIG. 2.

FIG. 5 is a partially enlarged cross-sectional view of a modification of the retaining ring of FIG. 4;

FIG. 6 is a longitudinal section view of a second embodiment of the vehicle wheel bearing apparatus.

FIG. 7 is a longitudinal section view of a prior art vehicle wheel bearing apparatus.

FIG. 8 is a partially enlarged cross-sectional view of the caulked portion of FIG. 7.

FIG. 9 is a longitudinal section view of another prior art vehicle wheel bearing apparatus.

FIG. 10 is an explanatory view of the caulking process;

FIG. 11 is a schematic view of a crack caused by the caulking process.

DETAILED DESCRIPTION

One mode for carrying out the present disclosure is a vehicle wheel bearing apparatus with an outer and inner member. The outer member is integrally formed, on its outer circumference, with a body mounting flange. The outer member inner circumference includes double row outer raceway surfaces. The inner member includes a wheel hub formed with a wheel mounting flange on its one end. The wheel hub outer circumference has an inner raceway surface corresponding to one of the double row outer raceway surfaces. A cylindrical portion axially extends from the inner raceway surface. An inner ring is press-fit onto the cylindrical portion of the wheel hub, via a predetermined interference. The inner ring outer circumference has an inner raceway surface corresponding to the other of the double row outer raceway surfaces. Double row rolling elements are freely rollably contained between the outer and inner raceway surfaces of the outer and inner members, via cages. Seals are mounted within annular openings formed between the outer and the inner members. The inner ring is secured on the wheel hub by a caulked portion. The caulked portion is formed by radially outwardly plastically deforming the end of the cylindrical portion of the wheel hub. A rolling bearing is fit onto the inner circumference of the wheel hub and positioned and secured by a retaining ring. The retaining ring is mounted at an inner side position of a bearing center line. A retaining ring groove, for mounting the retaining ring, is formed with a substantially rectangular cross-section. The outer side and inner side corner portions are formed with circular arc cross-sections. Each corner portion has a radius of curvature. The radius of curvature of the outer side corner portion is larger than the radius of curvature of the inner side corner portion.

Preferable embodiments of the present disclosure will be described with reference to the drawings. FIG. 1 is a longitudinal section view of a first embodiment of the vehicle bearing apparatus. FIG. 2 is a partially enlarged cross-sectional view of the retaining ring of FIG. 1. FIG. 3(a) is a partially enlarged cross-sectional view of the retaining ring groove of FIG. 2. FIG. 3(b) is a partially enlarged cross-sectional view of a modification of the retaining ring groove of FIG. 3(a). FIG. 4 is a partially enlarged cross-sectional view of a modification of the retaining ring of FIG. 2. FIG. 5 is a partially enlarged cross-sectional view of a modification of the retaining ring of FIG. 4. In the description of the present disclosure, an outer side of the wheel bearing apparatus, when it is mounted on a vehicle, is referred to as the "outer side" (left side in drawings). An inner side of the bearing apparatus, when it is mounted on a vehicle, is referred to as the "inner side" (right side in drawings)

The illustrated wheel bearing apparatus is used for a driving wheel. It includes a wheel hub 1 and a wheel bearing 2 press-fit onto the wheel hub 1. The wheel hub 1 is integrally formed, on its outer side end, with a wheel mounting flange 3 to mount a wheel (not shown). A cylindrical portion $1b$ axially extends from the wheel mounting flange 3, via a shoulder portion $1a$. The wheel hub inner circumference includes torque transmitting serrations (or splines) 1c. Hub bolts 3a are also arranged on the wheel mounting flange 3 equidistantly along its periphery.

The wheel bearing 2 has an outer member 4. A body mounting flange 4b is integrally formed on the outer member 5 outer circumference. The body mounting flange 4b is to be mounted on a knuckle (not shown). The outer member inner circumference includes double row raceway surfaces 4a, 4a. A pair of inner rings 5, 5, formed on their outer circumferences with tapered inner raceway surfaces 5a, is arranged opposite to the double row outer raceway surfaces 4a, 4a. Double row tapered rollers 7, 7 are freely rollably contained between the outer and inner raceway surfaces, via cages 6. A larger flange portion 5b, for guiding the tapered roller 7, is formed on the larger diameter side of the inner raceway surface 5a of each inner ring 5. A smaller flange portion 5c, for preventing fallout of the tapered roller 7, is on the smaller diameter side of each inner ring 5. The pair of the inner rings 5, 5 is arranged with their smaller flange portions 5c abutting against each other to form a tapered roller bearing of the back-to-back duplex type.

The outer member 4 and the inner ring 5, 5 are formed from high carbon chrome steel such as SUJ2. They are hardened to their core by dipping quenching to have a hardness of 58-64 HRC. The outer member 4 can be also formed from medium carbon steel including carbon of 0.40-0.80% by weight such as S53C (SC family carbon steel for machine structural use of JIS). The double row outer raceway surfaces 4a, 4a are hardened by high frequency induction hardening to have a surface hardness of 58-64 HRC.

The wheel hub 1 is made of medium carbon steel including carbon of 0.40-0.80% by weight such as S53C. It is hardened by high frequency induction hardening so that a region from the shoulder portion 1a, being a base of the wheel mounting flange 3, to the cylindrical portion 1b has a surface hardness of 50-64 HRC. The caulked portion 8 remains as is so that it still has a surface hardness of 25 HRC or less after forging.

Seals 9, 9 are mounted within annular openings formed between the outer member 4 and inner rings 5, 5. Each seal 9 forms a so-called pack seal. It includes an annular sealing plate 10, with an L-shaped cross section, and a slinger 11 arranged opposite to each other to prevent leakage of grease contained in the bearing and entering of rain water and dust into the bearing from outside.

The wheel bearing 2 is press fit onto the cylindrical portion 1b via a predetermined interference. The larger end face 5d of the outer side inner ring 5 abuts against a shoulder portion 1a of the wheel hub 1. The wheel bearing 2 is also axially secured relative to the wheel hub 1 by a caulked portion 8. The caulked portion 8 is formed by radially outwardly plastically deforming the end of the cylindrical portion 1b. This makes it possible to have a self-retaining structure where a stable pre-load can be maintained for a long term without controlling the pre-load with adjusting fastening torque of a nut, etc. In addition, although it is shown with a double row tapered roller bearing, the present disclosure may be applied to a double row angular contact ball bearing using balls as the rolling elements.

According to the present disclosure, a rolling bearing 12, of a deep groove ball bearing, is press fit onto the inner circumference of the wheel hub 1. A retaining ring 13 positions and secures the rolling bearing 12 at a position inner side of a bearing center line B/C and near the caulked portion 8. An outer ring 12a of the rolling bearing 12 is axially positioned and secured by the retaining ring 13 mounted in a retaining ring groove 14 formed on the inner circumference of the end portion of the cylindrical portion 1b, as shown in FIG. 2. The retaining ring groove 14 has a substantially rectangular cross-section as shown in FIG. 3(a). Corner portions 15, 16 are formed with circular arc surfaces of different radii of curvatures Ro, Ri. More particularly the radius of curvature Ri, of the inner side corner portion 16, is usually limited to R 0.6 mm or less. The radius of curvature Ro of the outer side corner portion 15 is larger than the radius of curvature Ri of inner side corner portion 16 (Ro>Ri) and it is set within a range of R1-R3 mm. According to such a structure, it is possible to prevent the generation of cracks and assure the strength of the caulked portion 8. The tensioning stress is caused mainly in the outer side corner 15 of the retaining ring groove 14. Thus, the corner relaxes when the end of the cylindrical portion 1b is plastically deformed during its caulking process. The tensioning stresses are caused in the corners 15, 16 of the retaining ring groove 14. In addition, it is possible to prevent the growth of micro cracks into large ones and thus improve the durability of the wheel bearing apparatus by relaxing the stress when a large moment load is applied to the wheel bearing apparatus during running of a vehicle. Furthermore, since the retaining ring 13 is held by a bottom 14a of the retaining ring groove 14, an inner side surface 14b of the groove 14, and an end face of the outer ring 12a of the rolling bearing 12, the enlargement of the radius of curvature Ro of the outer side corner 15 does not give any negative influence on the retaining function of the retaining ring 13.

FIG. 3(b) shows a modification of the retaining ring groove 14 of FIG. 3(a). This retaining ring groove 17 is formed with a substantially rectangular cross-section and corners 18, 16, of different circular arc cross-sections. The radius of curvature Ri of circular arc surface of the inner side corner 16 is usually limited to R 0.6 mm or less. The circular arc surface of the outer side corner portion 18 is formed by a complex R (radius) including a plurality (herein two) of radii of curvatures Ro1, Ro2. This makes it possible to further prevent the generation of cracks and assure the width of the fitting surface of the outer ring 12a of the rolling bearing and the strength of the caulked portion 8 even though the end of the cylindrical portion 1b is plastically deformed during its caulking process. The tensioning stresses are caused in the corner 18 of the retaining ring groove 17. Thus, it is also possible to assure the width of the fitting surface of the outer ring 12a of the rolling bearing.

FIG. 4 shows a modification of the retaining ring portion of FIG. 2. The same reference numerals as those used in the previous embodiment are also used to identify parts or portions that have the same functions in this modification. This retaining ring groove 19 is formed with a substantially rectangular cross-section. It has corners 18a, 16 formed as circular arc surfaces with different radii of curvatures Ro, Ri. The starting point of the circular arc surface of the outer side corner portion 18a is set at a position away from the inner side from the inner side end face of the outer ring 12a of the rolling bearing 12 by a distance "e" which is half the width of the retaining ring 13. This makes it possible to assure the width of the fitting surface of the outer ring 12a of the rolling bearing 12. Also, it further increases the radius of curvature Ro of the outer side corner portion 18a of the retaining ring groove 19. Accordingly, it further relaxes the stress concentration on the corner portion 18a of the retaining ring groove 19.

FIG. 5 shows a modification of the retaining ring portion of FIG. 4. The same reference numerals as those used in the previous modification are also used to identify parts or portions that have the same functions in this modification. This retaining ring 20 is formed with a substantially rectangular cross-section. The radially outer side corner portions of the retaining ring 20 are formed with chamfered portions 20a, 20b of different dimensions. The inner side chamfered portion is limited to 0.6 mm. The outer side chamfered portion is set within a range of 1 mm-5 mm. This makes it possible to prevent the generation of tensioning stress in the corner portion of the retaining ring groove 19 and stabilize fixation of the retaining ring 20.

FIG. 6 is a longitudinal section view of a second embodiment of the vehicle wheel bearing apparatus. The same reference numerals as those used in the previous embodiment are also used to identify parts or portions that have the same function in this embodiment.

This wheel bearing apparatus has a third generation type structure. It includes an inner member 22 with a wheel hub 21 and an inner ring 5 press fit onto the wheel hub 21. An outer member 4 is integrally formed, on its outer circumference, with a body mounting flange 4b. The outer member is also integrally formed, on its inner circumference, with double row tapered outer raceway surfaces 4a, 4a. Double row tapered rollers 7, 7 are rollably contained between the outer and inner raceway surfaces via cages 6.

The wheel hub 21 is integrally formed, on its outer side end, with a wheel mounting flange 3. The wheel hub outer circumference includes an inner raceway surface 21a opposite to one of the double row outer raceway surfaces 4a, 4a. A cylindrical portion 21b axially extends from the inner raceway surface 21a. A serration (or spline) 1c is formed on the cylindrical portion inner circumference for torque transmission. An inner ring 5 is secured, under a pre-stressed condition, by a caulked portion 8. The caulked portion is formed by radially outwardly plastically deforming the end of the cylindrical portion 21b.

The wheel hub 21 is made of medium carbon steel including carbon of 0.40-0.80% by weight such as S53C. It is hardened by high frequency induction hardening so that a region from the base of the Wheel mounting flange 3 to the cylindrical portion 21b has a surface hardness of 58-64 HRC.

Seals 9, 9 are mounted within annular openings formed between the outer member 4 and inner member 22. The seals 9, 9 prevent leakage of grease contained in the bearing and the entry of rain water and dust into the bearing from the outside.

Similarly to the previous embodiment, the retaining ring groove 14 is formed on the inner circumference of the end of the cylindrical portion 21b before the caulking process. As previously described, the retaining ring groove 14 is formed with a substantially rectangular cross-section. It has corner portions 15, 16 with circular arc cross-sections having radii of curvatures Ro, Ri. This makes it possible to improve the strength and rigidity of the wheel hub 21. Thus, it provides a wheel bearing apparatus that can prevent the generation of cracks and assure the strength of the caulked portion 8 even though the end of the cylindrical portion 1b is plastically deformed during its caulking process and tensioning stresses are caused in the corner of the retaining ring groove 14.

The wheel bearing apparatus of the present disclosure can be applied to bearing apparatus of the first through third generation types provided with a wheel hub and inner ring(s) fit onto the wheel hub and secured on the wheel hub by a caulked portion formed by a swing motion caulking process.

The present disclosure has been described with reference to the preferred embodiments. Obviously, modifications and alternations will occur to those of ordinary skill in the art upon reading and understanding the preceding detailed description. It is intended that the present disclosure be construed to include all such alternations and modifications insofar as they come within the scope of the appended claims or their equivalents.

What is claimed is:

1. A vehicle wheel bearing apparatus comprising:
   an outer member formed, on its inner circumference, with double row outer raceway surfaces;
   an inner member including a wheel hub formed on an outer circumference with a wheel mounting flange at one end, a cylindrical portion axially extends from the wheel mounting flange, at least one inner ring is press-fit onto the cylindrical portion of the wheel hub, via a predetermined interference, the inner member outer circumference includes double row inner raceway surfaces arranged opposite to the double row outer raceway surfaces;
   double row rolling elements are freely rollably contained between the outer and inner raceway surfaces of the outer and inner members, via cages;
   seals are mounted within annular openings formed between the outer and the inner members;
   a rolling bearing is fit onto the inner circumference of the wheel hub and positioned and secured by a retaining ring;
   the retaining ring is mounted at an inner side position of a bearing center line;
   a retaining ring groove, for mounting the retaining ring, is formed with a substantially rectangular cross-section; and
   outer side and inner side corner portions of the retaining groove are formed with circular arc cross-sections, each portion having a radius of curvature, the radius of curvature of the outer side corner portion is larger than the radius of curvature of the inner side corner portion.

2. The vehicle wheel bearing apparatus of claim 1, wherein the inner ring is secured relative to the wheel hub by a caulked portion, the caulking portion is formed by plastically deforming the end of the cylindrical portion of the wheel hub, and the retaining ring groove is formed near the caulked portion.

3. The vehicle wheel bearing apparatus of claim 1, wherein the radius of curvature of the inner side corner portion is limited to 0.6 mm or less and the radius of curvature of the outer side corner portion is set within a range of 1-3 mm.

4. The vehicle wheel bearing apparatus of claim 1, wherein the outer side corner portion is formed by a complex radius comprising a plurality of radii of curvatures.

5. The vehicle wheel bearing apparatus of claim 1, wherein a starting point of the circular arc surface of the outer side corner portion is set at a position away from an inner side of an inner side end face of the outer ring of the rolling bearing by a predetermined distance.

6. The vehicle wheel bearing apparatus of claim 5, wherein the starting point Of the circular arc surface of the outer side corner portion is set at a position away from the inner side of the inner side end face of the outer ring of the rolling bearing by a distance of substantially half of the width of the retaining ring.

7. The vehicle wheel bearing apparatus of claim 1, wherein the retaining ring is formed with a substantially rectangular cross-section and radially outer side corner portions of the retaining ring are formed with chamfered portions of different dimensions, and an outer side chamfered portion is larger than an inner side chamfered portion.

8. The vehicle wheel bearing apparatus of claim 7, wherein the inner side chamfered portion is limited to 0.6 mm and the outer side chamfered portion is set within a range of 1 mm-5 mm.

* * * * *

UNITED STATES PATENT AND TRADEMARK OFFICE
CERTIFICATE OF CORRECTION

| | |
|---|---|
| PATENT NO. | : 8,267,593 B2 |
| APPLICATION NO. | : 13/309937 |
| DATED | : September 18, 2012 |
| INVENTOR(S) | : Hiroto Suma |

It is certified that error appears in the above-identified patent and that said Letters Patent is hereby corrected as shown below:

Column 1
Line 61, "Si" should be --51--

Column 9
Line 35, "Wheel" should be --wheel--

Column 10
Line 50, "Of" should be --of-- (1st occurrence)

Signed and Sealed this
Twenty-ninth Day of January, 2013

David J. Kappos
*Director of the United States Patent and Trademark Office*